March 14, 1967     J. O. WHITE     3,308,544

LINE MEASURING DEVICE

Filed Dec. 6, 1965     2 Sheets-Sheet 1

INVENTOR
Jack O. White
BY
Weir, Marshall, MacRae & Lamb
PATENT AGENTS

March 14, 1967 J. O. WHITE 3,308,544
LINE MEASURING DEVICE
Filed Dec. 6, 1965 2 Sheets-Sheet 2
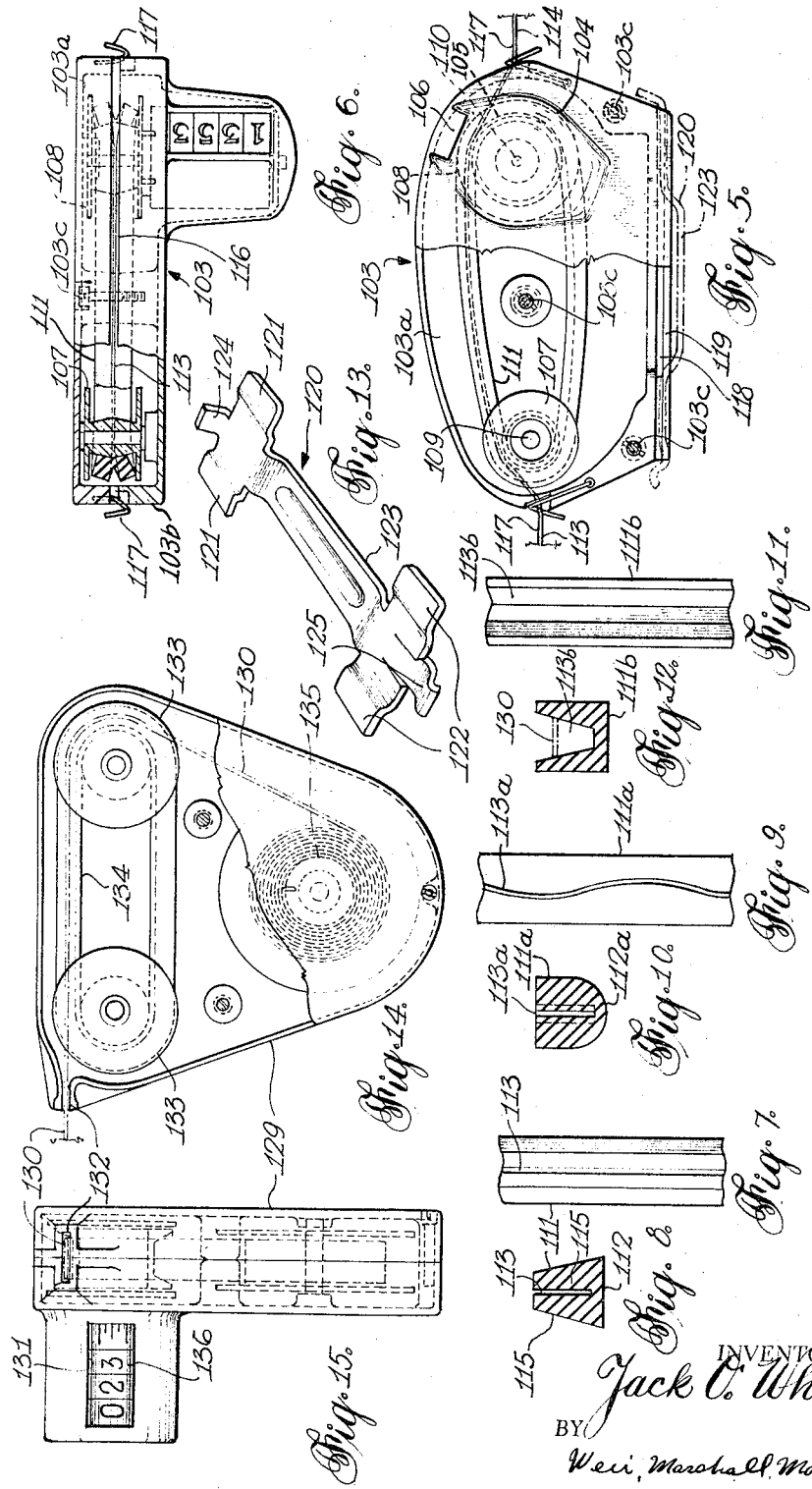

United States Patent Office 3,308,544
Patented Mar. 14, 1967

3,308,544
LINE MEASURING DEVICE
Jack O. White, 280 Kingsway, Welland Junction,
Ontario, Canada
Filed Dec. 6, 1965, Ser. No. 511,743
Claims priority, application Canada, May 14, 1963,
875,524; Great Britain, July 1, 1965, 27,837/65
3 Claims. (Cl. 33—134)

This invention relates to a line measuring device and more particularly, to a device for indicating the length of line which has been stripped from a fishing reel.

This is a continuation-in-part of my copending U.S. patent application 288,003, filed June 14, 1963.

It is known that fish of a particular species dwell during certain times at a particular depth. Therefore, it is desirable for a fisherman to be able to determine the amount of line which has been let out, and thereby locate his lure at a predetermined depth and return his line to a depth at which a fish has been hooked.

It is also desirable, of course, to establish the length of other types of lines such as power or communication cable which is being pulled from a spool or a line which is being stretched between two points for the sole purpose of determining the spacing of the two points.

It is the purpose of the present invention to provide a device of relatively inexpensive construction which can be mounted on a fishing rod in front of the reel or adjacent other types of line storage reels for measuring the line stripped from the reel.

According to the present invention, there is provided a frame, aligned first and second pulleys mounted for rotation on the frame, a counter carried by the frame and arranged to be driven by rotation of one of the pulleys, and an endless belt in the form of a flexible band of resilient material encircling the pulleys and being in driving engagement therewith, the belt having transversely disposed line gripping members formed integrally with the band along the outer periphery thereof. The gripping members are disjoined by a longitudinal line receiving slit or narrow channel extending inwardly from the outer periphery of the band. Also provided are guide means on the frame for directing the line between the gripping members along a flight of the gripping members along a flight of the belt between the two pulleys, and means for separating the gripping members from a line gripping relationship to a line releasing relationship during passage of the belt over the pulleys so that line being pulled past the flight is gripped by the gripping members along the flight and the movement of the line circulates the belt to thereby register said movement on the counter by way of rotation of said one of the pulleys.

In one embodiment of the invention, the band has a normally flat inner surface for engagement with the pulleys, and the means for separating the gripping members at each pulley is a peripheral belt engaging surface of convex transverse cross-section on each pulley whereby the inner surface of the band is flexed concavely to thereby force the gripping members apart as the belt passes over the pulleys.

In the drawings, which show certain embodiments of the invention, by way of example, FIG. 1 is a side elevational view of one embodiment of the line measuring device;

FIG. 5 is a side elevational view of another embodiment of the present invention partially broken away for the sake of clarity;

FIG. 6 is a top view partially in section of the device shown in FIG. 5;

FIG. 7 is a partial top view of another form of belt which may be used in the present invention;

FIG. 8 is a transverse sectional view through the belt of FIG. 7;

FIG. 9 is a partial top view of yet another form of belt which may be used in the present invention;

FIG. 10 is a transverse sectional view through the belt of FIG. 9;

FIG. 11 is a partial top view of still another form of the belt which may be used in the present invention;

FIG. 12 is a transverse sectional view through the belt of FIG. 11;

FIG. 13 is a perspective view of a holding member for attaching the device shown in FIGS. 5 and 6 to a fishing rod;

FIG. 14 is a side elevational view partially broken away of another form of the present invention; and FIG. 15 is an end view of the device shown in FIG. 14.

Figure 1:
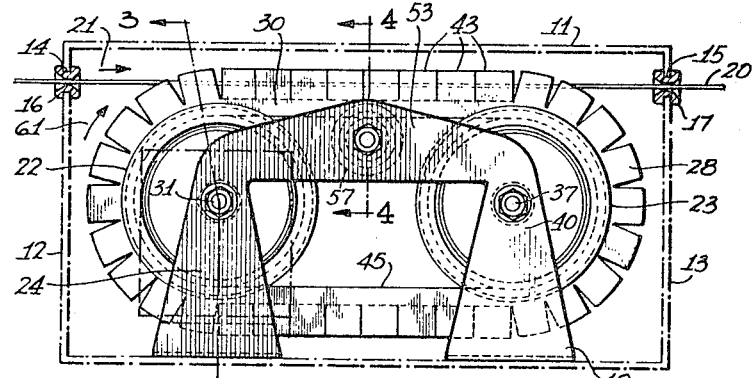
Figure 2:
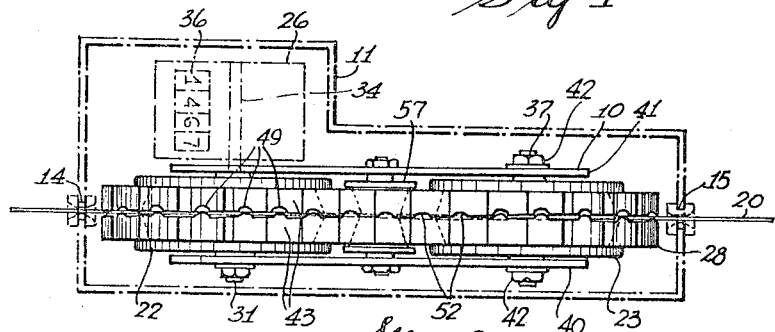
FIG. 2 is a top view of the device of FIG. 1.

Referring firstly to the embodiment shown in FIGURES 1 to 4, reference character 10 denotes a frame. The frame 10 includes a housing 11 which completely enclosed the working parts of the device. Opposite ends 12 and 13 (see FIGURES 1 and 2) of the housing 11 are provided with aligned openings 14 and 15. Received in the openings 14 and 15 are bushings 16 and 17, respectively, which provide the guide means for guiding a line 20. The device is preferably secured by clamps (not shown) to the fishing rod immediately in front of the reel so that line 20 leaving the reel is guided past the frame in the direction of the arrow 21 by bushings 16 and 17.

Figures 3, 4:
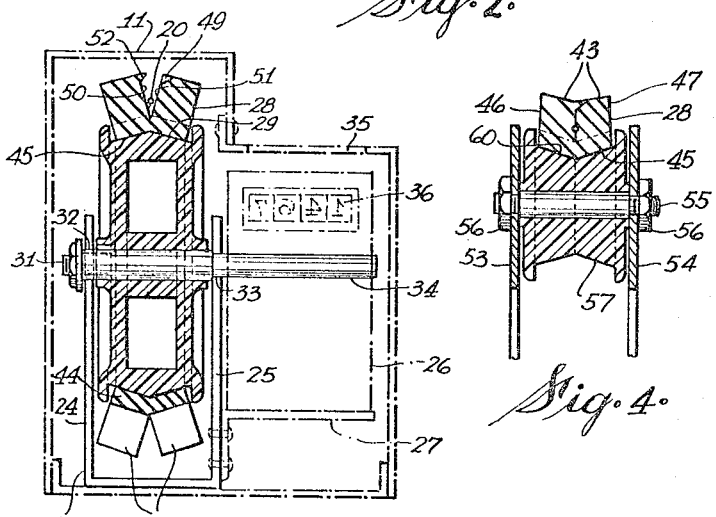
FIG. 3 is a cross-sectional view taken along the line 3—3 of FIG. 1.
FIG. 4 is a cross-sectional view of a pulley taken along the line 4—4 of FIG. 1.

A first pulley 22, which is preferably formed of nylon, is fixed to a shaft 31. The pulley 22 has a peripheral belt engaging surface 29, which is convex in transverse cross-section as is shown in FIGURE 3. The shaft 31 is mounted for rotation in openings 32 and 33 in spaced upright members 24 and 25 of frame 10. An end 34 of the shaft 31 extends into and drives an odometer type counter 26 which is fixed to the upright member 25 (see FIGURE 3) by bracket 27. The housing 11 has a window 35 immediately above the counter so that the user can view a reading 36 indicated by the counter.

A second pulley 23, which is also preferably formed of nylon, is mounted for rotation between upright members 40 and 41 of the frame 10 on a shaft 37. The pulley 23 has a belt engaging surface which is convex in cross-section similar to pulley 22. The shaft 37 passes through openings in the upright members 40 and 41 and is secured against rotation by nuts 42, 42 threaded onto its outer ends.

An endless belt 28 encircles the pulleys 22 and 23 and is in driving engagement therewith. The belt 28 presents an upper flight 30 between the pulleys 22 and 23 parallel and adjacent to the line 20 passing the frame 10. Extending outwardly from the belt 28 is a plurality of aligned pairs of gripping members 43. The belt 28 is formed from a continuous band 44 of resilient material such as rubber and the band 44 has an inner pulley engaging surface 45 which is normally flat in transverse cross-section. Each pair of gripping members 43 includes transversely disposed lugs 46 and 47 which are also formed of resilient material and are integral with the band 44. The lugs 46 and 47 are of sufficient depth that the lugs on the flight 30 extend upwardly past the line 20, the lugs 46 and 47 presenting line engaging surfaces 50 and 51 therebetween which normally extend substantially perpendicularly from the band 44. At the outer edge of each lug 46 there is provided a small projection 52 which is integral with the lug 46. A recess 49 is formed in each lug 47 opposite to the projection 52 and is of sufficient size to receive therein the projection 52.

Upright members 24 and 40 and upright members 25 and 41 of the frame 10 are joined at their upper ends by cross members 53 and 54, respectively. A shaft 55 extends between cross members 53 and 54 and is fixed thereto by nuts 56, 56 threaded onto its outer ends. Mounted for rotation on shaft 55 is a third pulley 57. The pulley 57 has a peripheral belt engaging surface 60 which is concave in transverse cross-section as shown in FIG. 4. The pulley 57 is arranged to engage the pulley engaging surface 45 at a point below the upper flight 30.

In operation, the section of the pulley engaging surface 45 which is in contact with the pulley 22 is flexed concavely by the convex belt engaging surfaces 29 of the pulley 22. The flexing of the band 44 separates all of the lugs 46 and 47 on the section in contact with the pulley as shown in FIG. 3. The line entering the device is guided by bushing 16 into the space between the lugs 46 and 47 on the section of band 44 in contact with the upper portion of pulley 22. As the band 44 leaves the pulley 22, it flexes back to its normal flat shape so that the line engaging surface 50 and 51 of lugs 46 and 47 loosely grasps the line 20 therebetween. When the band 44 flexes back to its normal flat shape, the projection 52 of the lug 46 moves into the recess 49 of the lug 47 to ensure that any vibration of the line 20 will not cause it to escape from between the lugs 46 and 47. As the band 44 passes over the pulley 57, the pulley engaging surface 45 is flexed convexly as shown in FIGURE 4 so that the line engaging surfaces 50 and 51 are forced to tightly grip the line 20 therebetween. Thus, the belt is drawn along by the line 20 in the direction indicated by arrows 61 in FIGURE 2 at the speed of the line. As the band 44 moves onto the second pulley 23, the pulley engaging surface 45 is again flexed concavely to spread the lugs 46 and 47, and to thereby permit the line to escape from between the lugs and to travel straight through the bushing 17.

The pulley 22 is driven, of course, by the belt, and therefore, revolves a certain number of times for each foot of line that passes through the device since the belt travels at the same speed as the line. The counter 26 is preferably geared to add a unit to its reading each time the shaft 31 revolves the certain number of times so that the reading indicates in feet the amount of line let out.

When the line is reeled in it travels in a direction opposite to that shown by the arrow 21, i.e. the line enters through bushing 17 and draws the belt in a direction opposite to that shown by arrow 61. As the belt travels in this opposite direction counter 26 is driven in reverse to subtract a unit from its reading for every foot that is reeled in.

Referring now to the device 103 shown in FIGURE 5 and 6, it can be readily seen that this device is similar in structure to that shown in FIGURES 1 to 4. The outer casing of device 103 consists of two sections 103a and 103b which are preferably of molded plastic and are fixed together by screws 103c. The section 103b has a hollow proturberance 104 which houses the odometer type counter 105. A window 106 is provided in the protuberance through which the reading on the counter 105 can be observed.

A pair of aligned pulleys 107 and 108 are mounted for rotation on shafts 109 and 110 carried between sections 103a and 103b. Both of the pulleys 107 and 108 are crowned to present a belt engaging surface of convex transverse cross-section as in the device of FIGURE 3. An endless belt 111 encircles the pulleys 107 and 108. The belt 111 is formed from a flexible band of resilient material such as rubber. The band may have a cross-section of a regular trapezoid with a normally flat inner surface 112 as shown in FIGURE 8. The inner surface engages the crowned surface of the pulleys 107 and 108. As may be seen from FIGURES 5 to 8, the band forming the belt 111 is provided with a longitudinally extending narrow channel or slit 113 which is of less width than the thickness of line 114. The slit 113 extends inwardly from the outer periphery of the band so as to provide outwardly extending opposed gripping members 115, 115. The edges of each of the two sections 103a and 103b have a slightly recessed section along the upper part of the casing over the upper flight of the belt to provide a line receiving slit-like opening 116. The slit-like opening 116 extends along the top of the casing from end to end and is provided with eyes in the form of downwardly open wire hooks 117, 117 at opposite ends thereof. The hooks are molded into the plastic or are clamped in grooves between the sections 103a, 103a so that they are held with the upper arcuate portion thereof aligned with the slit 113 in the belt 111 on the pulleys 107, 108.

The two sections 103a, and 103b are provided along their outside edges at the bottom of the casing with downwardly projecting flanges which have inwardly turned tips 119 whereby a longitudinal extending channel is provided for sliding reception of a holding bracket 120.

Holding bracket 120, which is preferably stamped from sheet metal, has a pair of laterally projecting flanges 121, 121 and 122, 122 adjacent opposite ends thereof (as shown in FIGURE 13) joined by an elongated central portion 123. The central portion 123 is in a lower plane than flanges 121, 121 and 122, 122 and is of less width than the spacing of the inwardly turned lips 119 at opposite sides of the bottom of the casing. At one end of bracket 120 an upwardly turned rigid lug 124 is provided and at the opposite end a spring finger 125 projects slightly above the plane of the flanges 122, 122. The spacing of lug 124 and finger 125 is only just greater than the length of the casing at the bottom.

The holding bracket is designed to be fixed to a fishing rod in front of the winding reel by winding tape by winding tape or cord around central portion 123 and the rod. Then by depressing spring finger 125 the device 103 can be slid lengthwise onto the holding member 120 to fix it to the rod. As the device is slid lengthwise the flanges 121, 121, and 122, 122 are received in the channel between the lips 119 and the bottom of the casing. As shown in FIGURE 5, the central portion 123 which is fixed to the rod projects out of the channel below the casing. As the casing of the device 103 engages lug 124, spring 125 flicks up to thereby lock the device between lug 124 and spring finger 125 against lengthwise movement relative to the rod. Thus, it can be seen that the device 103 can be readily installed on or removed from a fishing rod. If one has several fishing rods, it is possible, therefore, to obtain several holding brackets 120 and to tape one to each rod, and it is then possible to readily use the same measuring device 103 on any of the rods. Since the measuring device of the present invention operates independently of the reel on the fishing rod, the length of line being stripped from the reel can be accurately determined regardless of the diameter of the reel being used or the amount of line on the reel.

When the device 103 is mounted on a rod, the line 114 can be readily threaded into the slit 113 by drawing it into the slit-like opening 116 above the upper flight of the belt and slipping the line under the hooks 117, 117 at opposite ends of the device so that the line extends axially through the coils of wire as shown in FIGURE 5. By pulling the line taut it is forced into the slit 113. Since the inner surface 112 of the belt engages the convex shaped outer periphery of the pulleys 107, 108, it is flexed concavely which spreads the gripping members 115, 115 apart to line receiving relationship at each pulley. Accordingly, as line 114 is pulled in either direction through the hook 117 the line 114 enters between the spread line gripping members 115, 115 of the belt. Between the pulleys the line gripping members return to their normal position as shown in FIGURE 8 and since the slit is narrower than the thickness of the line, the line is gripped and due to the friction between the line and the gripping members the travel of the line through the device pulls the belt and the movement is registered on counter 105 as previously described. As the flight of belt passes over the pulley at the other end, the gripping members 115, 115 are again spread to release the line.

The hooks 117, 117 guide the line and keep it in the slit 113, and to assist in keeping the line in the slit, it is fed into the casing by the hooks 117, 117 below the upper flight so that the line has to bow upwards to travel the flight as shown in FIGURE 5. Thus, the tautness of the line forces the line deeper into the slit.

To increase the gripping effect of the belt on the line, the line receiving slit may be undulated in the longitudinal direction as shown at 113a of FIGURES 9 and 10 or it may be tapered inwardly from the outer periphery as shown at 114b in FIGURES 11 and 12 to improve the wedging effect of the line in the belt. The configuration of the tapered narrow channel 113b is also desirable when the line is flat or tape-like as will be described below.

Instead of utilizing pulleys which are crowned as shown in device 103, they may have a belt engaging surface of flat transverse cross-section, and the belt may have a rounded inner pulley engaging surface of convex transverse cross-section as shown at 112a in FIGURE 10. With this arrangement, the pulley engaging surface 112a of the belt is flexed flatly as it passes over the pulleys which again has the effect of opening the slit to a line receiving position.

The device shown in FIGURES 14 and 15 includes a casing 129 containing a line storage means and is capable of measuring distances in a manner similar to conventional tapelines. However, with the device shown in FIGURES 14 and 15, line 130 is not graduated as a conventional tape, but the length of line pulled from the device can be viewed on a counter in the casing through a window 131. Since the line is not graduated, it may be round or of narrow width as shown in FIGURE 15.

As in the device 103 shown in FIGURES 5 and 6, the casing 129 preferably consists of two molded halves held together by screws. The device has pulleys 133, 133, a belt 134 and a counter 136 connected to one of the pulleys the same as that described in the previous embodiment, but when the line is flat or tape-like, it is preferable to use a belt having a tapered channel as shown in FIGURES 11 and 12 so that the line wedges into the channel as shown in dotted lines in FIGURE 12. The casing 119 has a rectangular opening 132 which is located to guide the line evenly into and out of the channel in the belt as the belt passes over the pulley 133 adjacent the opening 132. The line 130 is wound on a spring loaded retraction spindle 135. The line passes onto the belt passing around the pulley 133 remote from opening 132, along the upper flight of belt 134 between the pulleys and out of the casing 129 through the opening 132.

In using the device shown in FIGURES 14 and 15, the line is pulled through opening 132, and as the line unwinds from the retraction spindle 135 and over the belt and pulley arrangement the amount of line emerging from the casing is registered on the counter 136 in the manner previously described. Thus, the length of line between its outer end and opening 132 can be read through window 131. When the line is released it is drawn back into the casing and rewound by retraction spindle 135. As the line is retracted, it circulates the belt 134 in the opposite direction as when it was withdrawn so that the counter 136 returns to zero reading.

Although the device of the present invention is described as being designed to measure a fishing line, it can be used equally as well for measuring any type of line or cable such as power or communication cable which is being pulled from a storage spool.

I claim:
1. A fishing line measuring device comprising a casing, an aligned pair of pulleys mounted for rotation within said casing, a counter carried in said casing and arranged to be driven by rotation of one of said pulleys, and endless belt in the form of a flexible band of resilient material encircling said pulleys and being in driving engagement therewith, said belt having a normally flat, pulley engageing, inner surface and transversely disposed line gripping members formed integrally with said band along the outer periphery thereof, said gripping members being disjoined by a longitudinal, line receiving, narrow channel extending inwardly from the outer periphery of the belt, each pulley having a peripheral belt engaging surface of convex transverse cross-section for flexing concavely the normally flat inner surface of the belt to thereby force the gripping members from a line gripping relationship apart to a line releasing relationship on passage of the belt over said pulleys, said casing having a line receiving slit over a flight of the belt between the two pulleys, downwardly open hooks exteriorly of said casing for holding the line in said slit and guiding the line between the gripping members on the belt passing over said pulleys, whereby line pulled through said slit is gripped by said gripping members along said flight and the movement of said line circulates the belt to thereby register said movement on said counter by rotation of said one pulley.

2. A device as defined in claim 1, wherein said casing has a longitudinally extending bottom channel for sliding reception of laterally projecting flanges of a holding member secured to a fishing rod.

3. A line measuring device comprising a frame, aligned first and second pulleys mounted for rotation on said frame, a counter carried by said frame and arranged to be driven by rotation of one of said pulleys, an endless belt in the form of a flexible band of resilient material encircling said pulleys and being in driving engagement therewith, said belt having a plurality of pairs of transversely opposed line gripping lugs formed integrally with said band along the outer periphery thereof, said pairs of lugs each having confronting line engaging surfaces normally extending perpendicularly to said band to define therebetween a longitudinal, line receiving, inwardly extending, narrow channel, the line engaging surface of one lug in each pair having a projection thereon adjacent the outer periphery of the belt and projecting laterally outward from the line engaging surface of the lug, the other lug of said each pair having a recess formed therein for receiving the projection when the lugs are in a line gripping position for trapping the line between the line engaging surfaces under said projection, guide means on said frame for directing the line into said channel along a flight of the belt between the two pulleys, and means for separating the lugs from the line gripping position to a line releasing relationship during passage of said belt over the pulleys, whereby line being pulled past said flight is gripped by said lugs along said flight and movement of said line circulates said belt to thereby register said movement on said counter by way of rotation of said one of said pulleys.

References Cited by the Examiner

UNITED STATES PATENTS

| | | | |
|---|---|---|---|
| 1,237,808 | 8/1917 | Ottinger | 33—139 |
| 1,991,137 | 2/1935 | Case et al. | 74—234 |
| 2,782,516 | 2/1957 | Stoeckel et al. | 33—129 |
| 2,793,440 | 5/1957 | Finkelstein | 33—134 |
| 2,833,044 | 5/1958 | Helms | 33—129 |
| 3,120,892 | 2/1964 | Henning et al. | 198—179 |
| 3,136,066 | 6/1964 | Spinn | 33—129 |

LEONARD FORMAN, *Primary Examiner.*

W. K. QUARLES, *Assistant Examiner.*